(12) United States Patent
Chung et al.

(10) Patent No.: US 7,626,546 B2
(45) Date of Patent: Dec. 1, 2009

(54) METHODS AND SYSTEMS FOR DETECTION AND LOCATION OF MULTIPLE EMITTERS

(75) Inventors: Hyo K. Chung, Greenville, TX (US); Phuong H. Le, Plano, TX (US); John M. Parker, Sachse, TX (US); David L. Reid, Richardson, TX (US); Mark A. Robertson, Greenville, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 298 days.

(21) Appl. No.: 11/904,630

(22) Filed: Sep. 27, 2007

(65) Prior Publication Data

US 2009/0224957 A1     Sep. 10, 2009

(51) Int. Cl.
*G01S 3/02*      (2006.01)
(52) U.S. Cl. .................................. 342/465
(58) Field of Classification Search ........... 342/465
See application file for complete search history.

(56) References Cited

U.S. PATENT DOCUMENTS

| | | | |
|---|---|---|---|
| 4,433,335 A | | 2/1984 | Wind |
| 5,008,679 A | | 4/1991 | Effland et al. |
| 5,045,860 A | * | 9/1991 | Hodson ............ 342/451 |
| 5,128,684 A | * | 7/1992 | Brown ............. 342/189 |
| 5,317,323 A | | 5/1994 | Kennedy et al. |
| 5,327,144 A | | 7/1994 | Stilp et al. |
| 5,355,325 A | * | 10/1994 | Uhlmann .......... 342/189 |
| 5,389,936 A | * | 2/1995 | Alcock ............ 342/465 |
| 5,406,291 A | | 4/1995 | Guerci et al. |
| 5,414,643 A | * | 5/1995 | Blackman et al. ..... 342/95 |
| 5,570,096 A | | 10/1996 | Knight et al. |
| 5,570,099 A | | 10/1996 | DesJardins |
| 5,608,410 A | | 3/1997 | Stilp et al. |
| 5,739,789 A | * | 4/1998 | Kronhamn ......... 342/465 |
| 5,914,687 A | | 6/1999 | Rose |

(Continued)

OTHER PUBLICATIONS

Gustafsson et al., "Positioning Using Time-Difference Of Arrival Measurements", This Reference Was Available Prior To The Filing Date Of The Present Application, 4 pgs.

(Continued)

*Primary Examiner*—Gregory C Issing
(74) *Attorney, Agent, or Firm*—O'Keefe, Egan, Peterman & Endera LLP (57) ABSTRACT

Systems and methods for detection and geolocation of multiple emitters that are emitting RF signal energy on a common frequency, and that may be implemented to separate, geolocate, and/or determine the number of emitters (e.g., radio users) emitting on a common RF frequency. Real-time signal qualification processing may be employed to continuously monitor and collect incoming receiver tuner data for signal activity and ignore irrelevant noise data. Each set of data blocks from an emitter transmission signal may be defined as an emission cluster, and a set of time difference of arrival (TDOA)/frequency difference of arrival (FDOA) pairs may be computed for each emission cluster with each TDOA/FDOA pair yielding a geolocation result. A statistical qualification method may be used to produce a final geolocation answer from each set of emission cluster geolocation results, and a geolocation error ellipse computed for the final geolocation answer of each emission cluster. The final geolocation answer of each emission cluster may be run through a correlation and fusion algorithm.

25 Claims, 5 Drawing Sheets

U.S. PATENT DOCUMENTS

| | | | |
|---|---|---|---|
| 6,018,312 A | 1/2000 | Haworth | |
| 6,292,136 B1 * | 9/2001 | Egnell | 342/432 |
| 6,618,009 B2 | 9/2003 | Griffin et al. | |
| 6,665,332 B1 | 12/2003 | Carlson et al. | |
| 6,677,893 B2 | 1/2004 | Rideout et al. | |
| 6,734,824 B2 | 5/2004 | Herman | |
| 6,853,629 B2 | 2/2005 | Alamouti et al. | |
| 7,508,344 B2 * | 3/2009 | Stroud | 342/387 |
| 2005/0151093 A1 | 7/2005 | Zaugg | |
| 2007/0120738 A1 | 5/2007 | Stroud | |

OTHER PUBLICATIONS

Stilp, Apr. 1, 1997, 2 pgs.

"Guardrail Common Sensor", http://www.globalsecurity.org/intell/systems/guardrail.htm, Printed From Internet Feb. 16, 2005, 11 pgs.

"Basis Of Issue Plan-BOIP", Airborne Relay Facility, http://www.fas.org/irp/program/collect/docs/bnM050AE.htm, Printed From Internet Feb. 15, 2005, 2 pgs.

Stein, "Algorithms For Ambiguity Function Processing", IEEE Transactions On Acoustics, Speech And Signal Processing, vol. ASSP-29, No. 3, Jun. 1981, pp. 588-599.

* cited by examiner

METHODS AND SYSTEMS FOR DETECTION AND LOCATION OF MULTIPLE EMITTERS

FIELD OF THE INVENTION

The present invention relates generally to signal emissions, and more particularly to detection and location of signal emitters.

BACKGROUND OF THE INVENTION

TDOA/FDOA techniques have been employed in the past to determine the geolocation of emitters of electromagnetic radiation, such as radio frequency ("RF") emissions. Using such techniques, the time difference (TDOA) in reception of a radio signal received at the sensing platforms of two spaced apart aircraft may be used to define a hyperboloid upon which the RF emitter of interest is located. Frequency difference (FDOA) in reception of the same radio signal at the sensing platforms of the two spaced apart aircraft may be generated by flying the spaced apart aircraft at different velocities and headings relative to the RF emitter, and may be used to further resolve the geo-location of the radio emitter. In this regard, assuming that the RF emitter of interest is located on the surface of the earth, the intersection of the TDOA hyperboloid, the FDOA surface, and the surface of the earth may be employed to determine a set of possible geo-locations for the RF emitter. However, only one of these possible geo-locations is real, the other possible geo-locations in the set are purely mathematical solutions that are not the real location of the radio emitter. To determine the correct geo-location requires additional information. This additional information is typically obtained from a system that can produce a line of bearing, from a third aircraft that can measure an independent TDOA/FDOA set of data, or by repositioning the two aircraft and then measuring a second TDOA/FDOA set of data.

Two aircraft have been employed as moving sensing platforms where sufficient time exists for measuring more than one set of TDOA/FDOA data from the RF emitter. This has been done by measuring a first set of TDOA/FDOA data at a first set of locations of the two aircraft followed by flying the two aircraft to a second set of locations and measuring a second set of TDOA/FDOA data at the second and new aircraft locations. The recomputed set of TDOA/FDOA data from the second set of aircraft locations may then be compared to the set of TDOA/FDOA data computed at the first set of aircraft locations to obtain a single overlapping answer for the geo-location of the emitter. Two aircraft may also be employed as moving sensing platforms in combination with additional equipment that is capable of generating a line of bearing, i.e., Inertial Navigation System (INS)/Global Positioning System (GPS) equipment, precision time reference equipment, and data link equipment.

TDOA/TDOA and FDOA/FDOA techniques have also been employed in the past to determine the geolocation of emitters of electromagnetic radiation, such as radio frequency ("RF") emissions. For example, using a TDOA/TDOA technique, the time difference (TDOA) in reception of a radio signal received at the sensing platforms of three spaced apart aircraft may be used to define two hyperboloids upon which the RF emitter of interest is located. The intersection of the two TDOA hyperboloids and the surface of the earth may be employed to determine a set of possible geo-locations for the RF emitter, which may be further resolved as previously described above. In another example, using a FDOA/FDOA technique, frequency difference (FDOA) in reception of the same radio signal at the sensing platforms of three spaced apart aircraft may be employed to generate two FDOA curves, and the intersection of the two TDOA hyperboloids and the surface of the earth may be employed to determine a set of possible geo-locations for the RF emitter, which also may be further resolved as previously described above.

In a radio communication environment, multiple RF signal emitters may transmit over the same frequency and at the same time. However, typical conventional geolocation systems are configured to operate with the assumption that there is only one emitter on the selected frequency at any given time. When operating under this assumption, a network of multiple emitters transmitting on the same frequency actually act to interfere with each other and the conventional geolocation system will yield no solution or only an invalid solution. One example of such a network of multiple emitters is a group of push-to-talk (PTT) radio users. To enhance the situational awareness, it is highly desirable to detect and geolocate all radio users sharing a common frequency channel setting. One major obstacle to accomplishing this goal is the short up-time characteristics of these PTT signals. Most conventional single collection systems will not have sufficient time to detect the signal activity, queue, collect, and process for emitter geolocation. Even if the signal can be detected, there isn't enough good signal captured to allow computation of an accurate geolocation or the determination of the number of users on the selected frequency channel setting. Another obstacle to accurate geolocation and number determination is the close proximity of the users in a PTT network given the line-of-sight limitations of these types of radios.

SUMMARY OF THE INVENTION

Disclosed herein are systems and methods for detection and geolocation of multiple emitters (e.g., a network of multiple transmitters) that are emitting RF signals on a common frequency. Using the disclosed systems and methods, multiple collection systems may be tasked to "camp" on a selected frequency until a RF signal of interest is detected. The disclosed systems and methods may be implemented to separate, geolocate, and/or determine the number of emitters (e.g., radio users) emitting on a common RF frequency. Examples of radio communication environments in which a network of multiple emitters may be transmitting on a common frequency include, but are not limited to, a network of PTT radios, multiple base stations of a cellular telephone network, multiple weather broadcast stations, etc. Communicating multiple emitters of any other type of communication networks that use the same frequency may also be separated, geolocated, and/or counted. In one exemplary embodiment, the disclosed systems and methods may be advantageously implemented in one exemplary embodiment to accurately separate and precisely geolocate multiple speakers communicating on a common frequency.

In one embodiment, the disclosed systems and methods may employ real-time signal qualification processing that acts to continuously monitor the incoming receiver tuner data for signal activity and that ignores irrelevant noise data until energy is detected. Upon detection of energy, the corresponding data blocks are saved off until noise data is detected once again. This process continues until the number of detected data blocks reaches a predetermined threshold. Each set of data blocks from an emitter transmission (e.g., containing the speech of one user emitted by a PTT radio) is defined as an emission cluster. All of the emission clusters may be queued and downloaded to a processing unit for precision geolocation. In this regard, a set of time difference of arrival (TDOA)/frequency difference of arrival (FDOA) pairs may be computed for each emission cluster via CAF (Cross Ambiguity Function) plane computation, or using any other suitable TDOA/FDOA computation method, with each TDOA/FDOA pair yielding a geolocation result. A statistical qualification method may then be used to produce a final geolocation answer from each set of emission cluster geolocation results. A geolocation error ellipse may be computed for the final geolocation answer of each emission cluster. In order to determine the unique users in the network, the final geolocation answer of each emission cluster may be run through a correlation and fusion algorithm. Further information on CAF processing may be found in S. Stein, "*Algorithms for Ambiguity Function Processing*", IEEE Transactions on Acoustics, Speech, and Signal Processing, Vol. ASSP-29, No. 3, June 1981, pp. 588-599, which is incorporated herein by reference.

Possible applications for the disclosed systems and methods include, but are not limited to, location of RF signal emitters in emergency situations (e.g., to locate lost ships, vehicles or personnel having an emergency RF signal emitter or transmitting via cell phone), location of RF signal emitters in law enforcement situations (e.g., to locate or track personnel or stolen property tagged with a RF signal emitter or transmitting via cell phone), location of RF signal emitters in wildlife management situations (e.g., to locate or track animals tagged with a RF signal emitter), location of RF signal emitters in law enforcement or military training or operational situations (e.g., to locate or track multiple persons communicating via PTT radios), etc.

In one respect, disclosed herein is a method of locating one or more emitters that are emitting multiple sequential radio frequency (RF) signals on a common frequency. The method may include: providing multiple collection nodes, each of the multiple collection nodes being spaced apart from the other of the multiple collection nodes; collecting the multiple sequential RF signals at each of the multiple collection nodes, each of the sequential emitted RF signals being collected at each of the multiple collection nodes as a cluster of data blocks; determining a first group of multiple geolocation solutions based on a first one of the multiple clusters of data blocks by measuring at least one of time difference of arrival (TDOA) information or frequency difference of arrival (FDOA) information for the multiple sequential RF signals between at least two of the multiple collection nodes; determining a second group of multiple geolocation solutions based on a second one of the multiple clusters of data blocks by measuring at least one of TDOA information or FDOA information for the multiple sequential RF signals between at least two of the multiple collection nodes; determining a first geographic area corresponding to the first one of the multiple cluster of data blocks, the first geographic area including at least a portion of the first group of multiple geolocations, and determining a second geographic area corresponding to the second one of the multiple cluster of data blocks, the second geographic area including at least a portion of the second group of multiple geolocations; and comparing the first determined geographic area with the second determined geographic area to determine whether or not the first determined geographic area correlates to the same emitter geolocation as the second determined geographic area.

In another respect, disclosed herein is an emitter location system, including: a first collection node configured to receive radio frequency (RF) signals, the first collection node including a first sensing platform and signal processing circuitry configured to process RF signals received at the first sensing platform on a time and frequency basis; a second collection node configured to receive radio frequency (RF) signals, the second collection node including a second sensing platform and signal processing circuitry configured to process RF signals received at the second sensing platform on a time and frequency basis; and a processing node including processing circuitry configured to communicate with the signal processing circuitry of the first collection node and the signal processing circuitry of the second collection node. The processing circuitry of the processing node may be configured to: receive radio frequency (RF) emission cluster data from each of the first and second collection nodes, the RF emission cluster data being produced by one or more RF emitters on a common frequency and including at least two different clusters of data blocks, perform at least one of time difference of arrival (TDOA)/frequency difference of arrival (FDOA), TDOA/TDOA, or FDOA/FDOA processing on the RF emission cluster data to produce at least two geolocation areas that each correspond to a respective different one of the clusters of data blocks, and compare a first one of the geographic areas with a second and different one of the geographic areas to determine whether or not the first geographic area correlates to the same emitter geolocation as the second determined geographic area.

In another respect, disclosed herein is a system for processing collected clusters of data blocks to locate one or more emitters that are emitting multiple sequential radio frequency (RF) signals on a common frequency. The system may include: one or more processing components configured to receive collected clusters of data blocks from each of multiple collection nodes, each of the collected clusters of datablocks collected from a corresponding sequential emitted RF signal, and the one or more processing components may be further configured to: determine a first group of multiple geolocation solutions based on a first one of the multiple clusters of data blocks by measuring at least one of time difference of arrival (TDOA) information or frequency difference of arrival (FDOA) information for the multiple sequential RF signals between at least two of the multiple collection nodes, determine a second group of multiple geolocation solutions based on a second one of the multiple clusters of data blocks by measuring at least one of TDOA information or FDOA information for the multiple sequential RF signals between at least two of the multiple collection nodes, determine a first geographic area corresponding to the first one of the multiple cluster of data blocks, the first geographic area including at least a portion of the first group of multiple geolocations, determine a second geographic area corresponding to the second one of the multiple cluster of data blocks, the second geographic area including at least a portion of the second group of multiple geolocations, compare the first determined geographic area with the second determined geographic area to determine whether or not the first determined geographic area correlates to the same emitter geolocation as the second determined geographic area, fuse together the first and second determined geographic areas into a single fused geographic area if the first and second determined geographic areas are determined to correlate to the same emitter location, the single fused geographic area including a location of at least one of the emitters, and output emitter geolocation information based on the single fused geographic area.

DESCRIPTION OF ILLUSTRATIVE EMBODIMENTS

Figure 1:
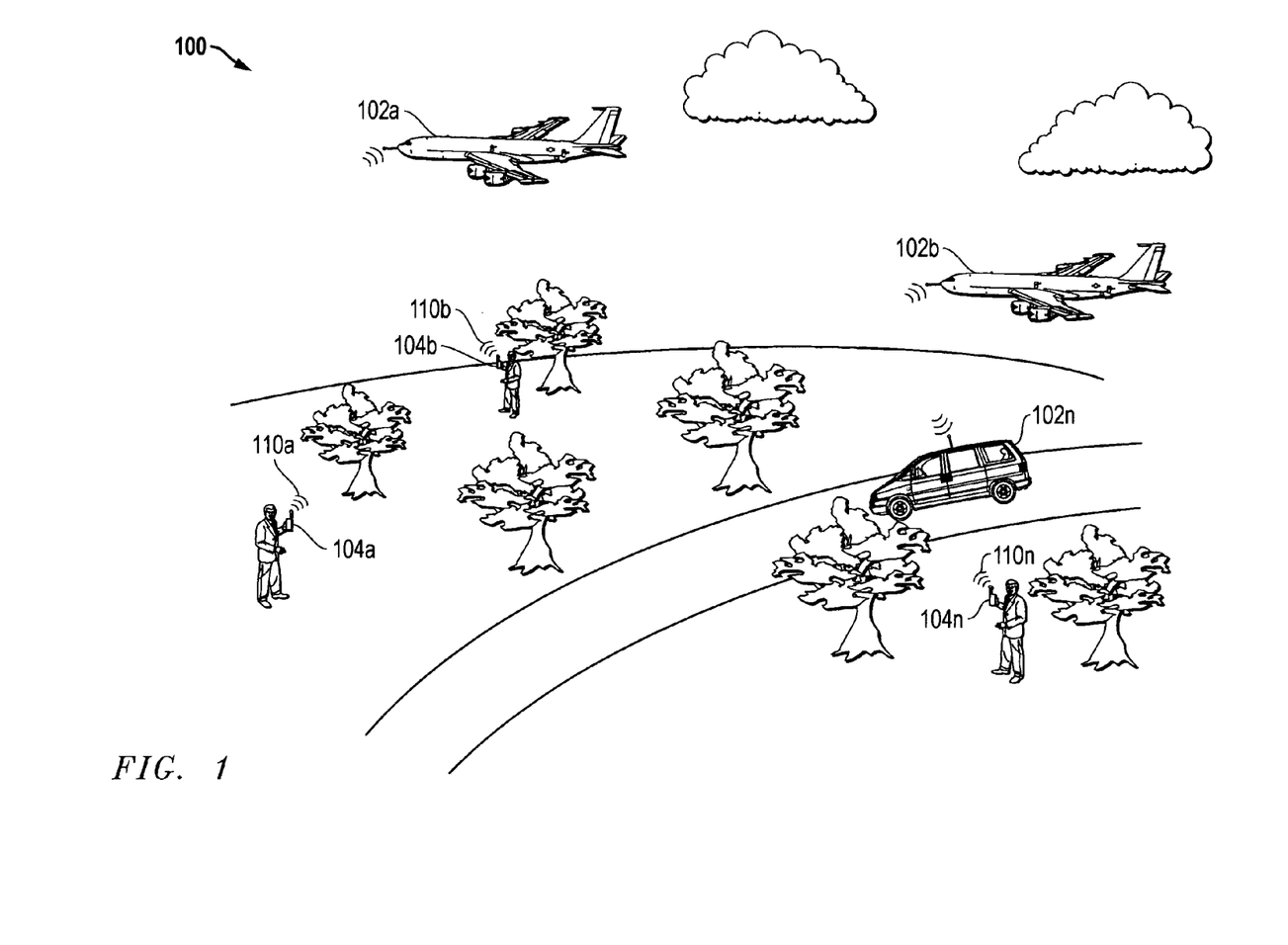
FIG. 1 illustrates a radio communication one exemplary embodiment of a RF emissions environment according to exemplary embodiment of the disclosed systems and methods.

FIG. 1 illustrates one exemplary embodiment of an RF emissions environment 100 (in this case a radio communication environment) in which multiple emitters in the form of PTT radios 104a and 104b through 104n are communicating in a radio communication network via respective RF signals 110a and 110b through 110n transmitted on a common frequency. In the illustrated embodiment, each emitter 104 is a ground-based mobile emitter (in this case a "walkie talkie" type radio) carried by a human being that is stationary and emitting from a fixed location. However, it will be understood that the disclosed systems and methods may be practiced in radio communication environments in which any type, number and/or combination of different types of emitters are transmitting on a common frequency including, but are not limited to, multiple base stations of a cellular telephone network, cell phone devices, multiple weather broadcast stations, radar signal sources, microwave sources, etc. Furthermore, besides being hand carried, emitters may be vehicle-borne (e.g., borne by automobile, ship, train, aircraft, etc.), permanently-fixed (e.g., fixed at a house or building, fixed on a transmission tower, etc.), a combination thereof, etc.

Still referring to FIG. 1, radio communication environment 100 also includes multiple mobile sensing platforms 102a and 102b through 102n (with n being equal to the total number of multiple sensing platforms in a given system) that each receive radio signals 110 emitted by emitters 104a and 104b through 104n of FIG. 1 (with n being equal to the total number of emitters transmitting on a common frequency). In this regard, the disclosed systems and methods may be implemented with more than three sensing platforms (e.g., with sensing platforms 102c, 102d, etc.) or as few as two sensing platforms (e.g., only 102a and 102b), and the number of multiple emitters transmitting on a common frequency may be greater than or equal to two. For detection and location of emitters using TDOA/FDOA processing (e.g., see step 306 of FIG. 3) two or more sensing platforms may be employed, with at least one of the sensing platforms moving relative to the emitter/s. Alternatively, TDOA/TDOA processing techniques may be employed using three or more sensing platforms, and FDOA/FDOA processing techniques may be employed using three or more sensing platforms, with at least two of the sensing platforms moving.

In the exemplary embodiment of FIG. 1, mobile sensing platforms 102a and 102b are each provided in the form of airborne-based signal collection platforms mounted on an aircraft, and mobile sensing platform 102n is provided in the form of a ground-based collection platform mounted on an automobile. However, although manned aircraft are illustrated as mobile sensing platforms in FIG. 1, a mobile sensing platform may be any other type of vehicle or movable device that is suitable for containing or otherwise supporting one or more RF sensors and moving relative to an RF emitter and to other mobile sensing platforms in a manner that allows determination of emitter geo-location in the manner described herein. Examples of other types of mobile sensing platforms include, but are not limited to, other types of aerial vehicles (e.g., unmanned aerial vehicles (UAVs), helicopters, etc.), space vehicles (e.g., satellites, missiles, etc.), surface vehicles (e.g., submarines, boats, trains, cars, trucks, etc.), etc. Furthermore, it will also be understood that the disclosed systems and methods may be implemented using one or more stationary sensing platforms and/or using any other type, number and/or combination of different types of mobile and/or stationary signal collection platforms including, but are not limited to, hand-carried platforms, vehicle-borne platforms (e.g., borne by automobile, ship, train, space vehicles, etc.), stationary platforms (e.g., fixed at a house or building, fixed on a transmission tower, etc.), a combination thereof, etc.

Figure 2:
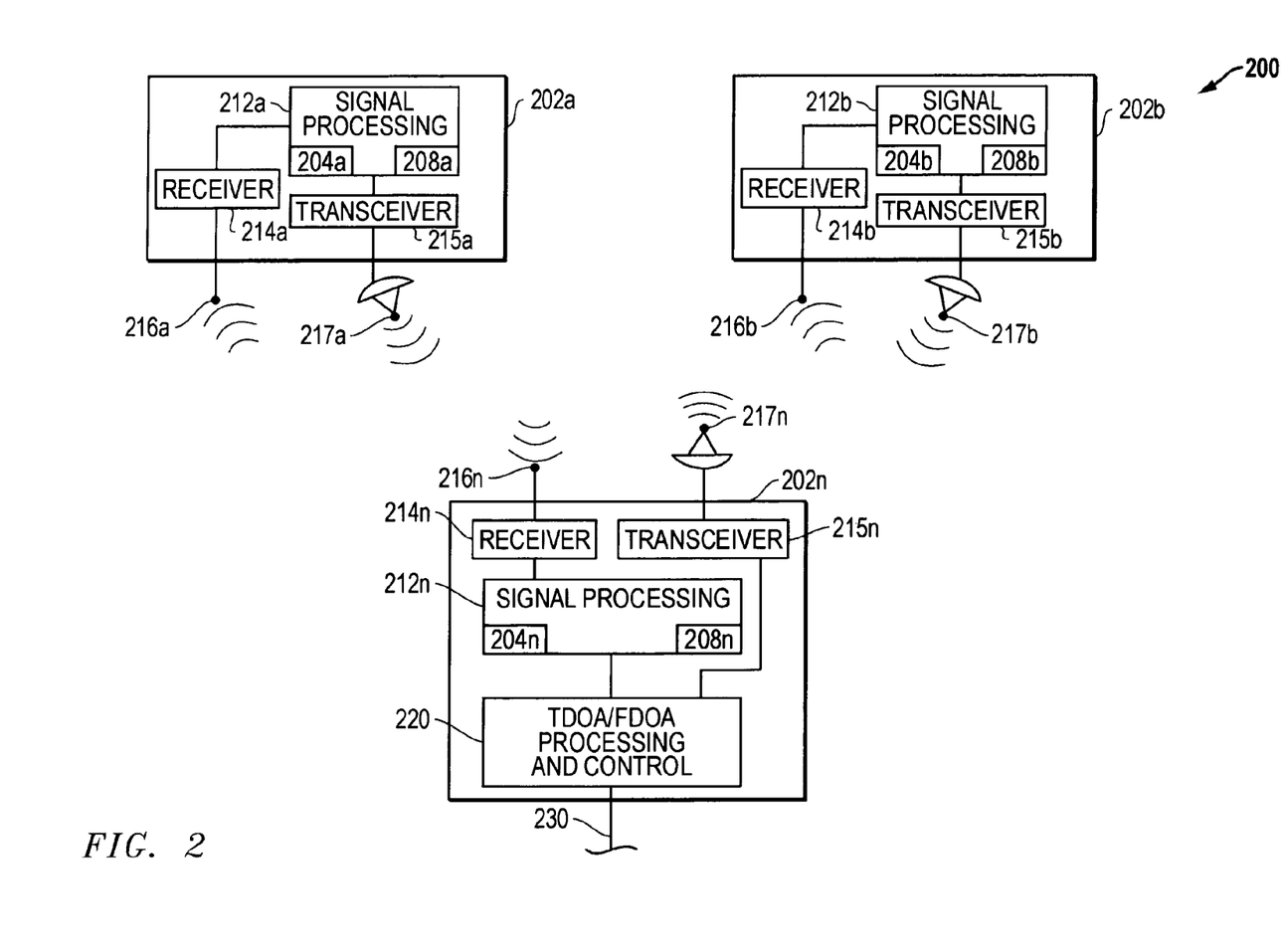
FIG. 2 illustrates a simplified block diagram of an emitter location system according to one exemplary embodiment of the disclosed systems and methods.

FIG. 2 illustrates a simplified block diagram of an emitter location system 200 according to one exemplary embodiment of the disclosed systems and methods that includes a first sensing platform 202a, a second sensing platform 202b, and a third sensing platform 202n that is also configured to perform TDOA/FDOA processing. In one exemplary embodiment, first sensing platform 202a may correspond to airborne sensing platform 102a of FIG. 1, second sensing platform 202b may correspond to airborne sensing platform 102b of FIG. 1, and third sensing platform 102n may correspond to mobile earth-based third sensing platform of FIG. 1 that are positioned within wireless signal communication range of each other.

Although illustrated in FIG. 2 provided as a component of third sensing platform 202n, it will be understood that components and functionality of TDOA/FDOA processing may alternatively be located on first and/or second sensing platforms 202a or 202b, or may be configured as part of a stand alone TDOA/FDOA processing and control platform that does not include emitter sensing components. It will also be understood that TDOA/FDOA processing may be provided as a component of a separate processing platform configured for operation in any suitable location and/or environment, e.g., configured as a separate stationary earth-based platform, airborne processing platform, ship-based platform, space-based platform, etc. Furthermore, although third sensing platform 202n of FIG. 2 is configured to perform TDOA/FDOA processing, it will be understood that an emitter location system may include one or more platforms that are configured to alternatively or additionally configured to perform TDOA/TDOA and/or FDOA/FDOA processing.

Sensing platform 202a of FIG. 2 is shown provided with a sensor antenna 216a that is coupled to signal processing circuitry 212a via receiver 214a (e.g., configured as a tunable receiver) to form a first signal collection node, sensing platform 202b is shown provided with a sensor antenna 216b that is coupled to signal processing circuitry 212b via receiver 214b to form a second signal collection node, and sensing platform 202n is shown provided with a sensor antenna 216n that is coupled to signal processing circuitry 212n via receiver 214n to form a third signal collection node. In the illustrated exemplary embodiment of FIG. 2, sensing platform also includes TDOA/FDOA processing and control circuitry 220 that that is coupled to signal processing circuitry 212n and configured to output emitter geolocation information 230 as will be described further herein. As so configured in this embodiment, sensing platform 202n is configured with components that act as a master controller for communicating and controlling operation of participating collection nodes corresponding to sensing platforms 202a and 202b, and to the collection node components of sensing platform 202n. In this exemplary embodiment, sensing platform 202n is also configured as a TDOA/FDOA processing node for data collected by signal collection nodes of sensing platforms 202. In other embodiments, sensing platform 202n may be alternatively or additionally configured with TDOA/TDOA and/or FDOA/FDOA processing and control circuitry so that sensing platform 202n is also or alternatively configured as a TDOA/TDOA and/or FDOA/FDOA processing node for data collected by signal collection nodes of sensing platforms 202.

In the illustrated embodiment of FIG. 2, sensor antennas 216a, 216b and 216n are each provided with respective receivers 214a, 214b and 214n to receive signals emitted by multiple RF emitters (e.g., RF emitters 104 of FIG. 1) in a manner as described elsewhere herein. Each of receivers 214a, 214b and 214c is in turn configured to provide signals received by respective sensor antennas 216a, 216b and 216n to respective signal processing circuitry 212a, 212b and 212n of its corresponding sensing platform 202. In this regard, each of signal processing circuitry 212a, 212b and 212n and TDOA/FDOA processing and control circuitry 220 may include a digital signal processor ("DSP") and/or any combination of one or more circuit components (e.g., processor/s, microprocessor/s, volatile or non-volatile memory, etc.) suitable for processing received emitter signals on a time and frequency basis (e.g., time measurement/tagging of received emitter signals, frequency measurement of received emitter signals, etc.) suitable for further use in determining TDOA and FDOA in a manner as described elsewhere herein. In the exemplary embodiment of FIG. 2, each of signal processing circuitry 212a, 212b and 212n includes a respective processor 204 and local memory buffer 208 for TDOA/FDOA processing as will be described further herein.

Still referring to the exemplary embodiment of FIG. 2, sensing platform 202a is shown provided with a communication antenna 217a that is coupled to signal processing circuitry 212a via transceiver 215a, and sensing platform 202b is shown provided with a communication antenna 217b that is coupled to signal processing circuitry 212b via transceiver 215b. In such a configuration, transceiver 215a may be provided to transmit processed emitter signal information from signal processing circuitry 212a to a TDOA/FDOA processing node of another platform (e.g., such as third sensing platform 202n of FIG. 1 or a stand-alone platform that includes TDOA/FDOA processing components) via communication antenna 217. Transceiver 215a may also be configured to provide control signals or other information to signal processing circuitry 212a that is received from TDOA/FDOA processing control components of another platform via communication antenna 217a. Likewise, transceiver 215b may also be configured to provide control signals or other information to signal processing circuitry 212b that is received from TDOA/FDOA processing and control circuitry of a separate platform via communication antenna 217b.

In FIG. 2, third sensing platform 202n is shown provided with a communication antenna 217n that is coupled to TDOA/FDOA processing and control circuitry 220 via transceiver 215n. In such a configuration, communication antenna 217n is provided to receive processed emitter signal information from each of sensing platforms 202a and 202b and to provide this information to TDOA/FDOA processing and control circuitry 220 for further processing, and signal processing circuitry 212n of sensing platform 202n is configured to provide emitter signal information of sensing platform 202n directly to TDOA/FDOA processing and control circuitry 220 for further processing. In this regard, emitter signal information from sensing platforms 202a, 202b and 202n may be processed by TDOA/FDOA processing and control circuitry 220 for generation of TDOA/FDOA data sets and separation, geo-location, and/or determination of the number of emitters transmitting on a common RF frequency. Transceiver 215n may also be configured to transmit control signals or other information from TDOA/FDOA processing and control circuitry 220 to sensing platforms 202a and 202b via communication antenna 217n.

As will be described further herein, in one embodiment of the disclosed systems and methods emitter signal collection may be synchronously initiated by a master controller (e.g., TDOA/FDOA processing and control circuitry of sensing platform 202n) by tasking all participating signal collection nodes (e.g., signal collection nodes of sensing platforms 202a, and 202b through 202n). For example, TDOA/FDOA processing and control circuitry of sensing platform 202n may transmit tasking information to signal collection node components (e.g., receiver/tuner components 214a and 214b, signal processing circuitry 212a and 212b) of each sensing platform 202a and 202b by RF datalink provided by communication antennas 217, and may provide tasking information by internal datalink to signal collection node components (e.g., receiver/tuner components 214n, signal processing circuitry 212n) within sensing platform 202n. Such tasking information may include, for example, specification of the signal frequency, collection bandwidth, signal bandwidth and collection duration to screen the received signals. When collection node components of a each sensing platform receives the tasking information via a datalink, the collection hardware asset (e.g., antenna, RF receiver/tuner, etc.) is scheduled accordingly.

In the practice of the disclosed systems and methods, any combination of TDOA and/or FDOA processing techniques may be employed that is suitable for determining the geolocation of RF emissions. Examples of such combinations include TDOA/TDOA, TDOA/FDOA and FDOA/FDOA processing techniques. For example, using one exemplary TDOA/FDOA processing technique, the time difference (TDOA) in reception of a RF signal from a given emitter 104 at each of two spaced-apart sensing platforms 202 may be used to define a hyperboloid upon which the given emitter 104 is located. Frequency difference (FDOA) in reception of the same radio signal at the two spaced sensing platforms 202 (e.g., aircraft) may be generated, e.g., by moving (e.g., flying) the spaced sensor platforms at different velocities and headings relative to the given emitter 104 to further resolve the geo-location of the radio emitter. If the given emitter 104 is located on the surface of the earth, the intersection of the TDOA hyperboloid, the FDOA surface, and the surface of the earth may be employed to determine a set of possible geo-locations for the given emitter 104, with one of these possible geo-locations being real, and the other possible geo-locations in the set being purely mathematical solutions that are not the real location of the given emitter 104. The real geolocation may be determined by producing a line of bearing, from a third sensing platform 202 (e.g., aircraft) that can measure an independent TDOA/FDOA set of data, or by repositioning the original two spaced sensing platforms 202 and then measuring a second TDOA/FDOA set of data.

In another example, where sufficient time exists for measuring more than one set of TDOA/FDOA data from the given emitter, only two moving sensing platforms 202 (e.g., aircraft) may be required to determine the geolocation of a given RF emitter 104. In such a case, a first set of TDOA/FDOA data may be first measured at a first set of locations of the two spaced sensing platforms 202, followed by flying the two sensing platforms to a second set of spaced-apart locations and measuring a second set of TDOA/FDOA data at the second and new sensing platform locations. The recomputed set of TDOA/FDOA data from the second set of sensing platform locations may then be compared to the set of TDOA/FDOA data computed at the first set of sensing platform locations to obtain a single overlapping answer for the geolocation of the emitter. In yet another example, TDOA/FDOA data from as few as two moving sensing platforms 202 may be employed to determine the geolocation of a given emitter 104 in combination with additional equipment that is capable of generating a line of bearing, i.e., Inertial Navigation System (INS)/Global Positioning System (GPS) equipment, precision time reference equipment, and data link equipment.

In another embodiment, using a TDOA/TDOA technique, the time difference (TDOA) in reception of a radio signal received at three sensing platforms 202 may be used to define two hyperboloids upon which a given emitter 104 is located. If the given emitter 104 is located on the surface of the earth, the intersection of the two TDOA hyperboloids and the surface of the earth may be employed to determine a set of possible geo-locations for the given emitter 104, with one of these possible geo-locations being real, and the other possible geo-locations in the set being purely mathematical solutions that are not the real location of the given emitter 104. The real geolocation may be determined as previously described.

In another embodiment, using a FDOA/FDOA technique, the frequency difference (FDOA) in reception of the same radio signal of a radio signal received at three sensing platforms 202 may be used to define two FDOA curves upon which a given emitter 104 is located. If the given emitter 104 is located on the surface of the earth, the intersection of the two FDOA curves and the surface of the earth may be employed to determine a set of possible geo-locations for the given emitter 104, with one of these possible geo-locations being real, and the other possible geo-locations in the set being purely mathematical solutions that are not the real location of the given emitter 104. The real geolocation may be determined as previously described.

Further information on configuration of sensing platforms, emitters, and TDOA/FDOA geolocation methodology that may be implemented in the practice of the disclosed systems and methods may be found in U.S. patent application Ser. No. 11/288,975 by Stroud entitled "Systems and Methods for TDOA/FDOA Location" and filed Nov. 29, 2005, which is incorporated herein by reference in its entirety. In addition, any suitable TDOA/FDOA algorithm may be employed in the practice of the disclosed systems and methods, for example, as described in "Positioning Using Time-Difference of Arrival Measurements" by Fredrik Gustafsson and Fredrik Gunnarsson, Department of Electrical Engineering, Linköping University, Linköping, Sweden, which is incorporated herein by reference.

Figure 3:
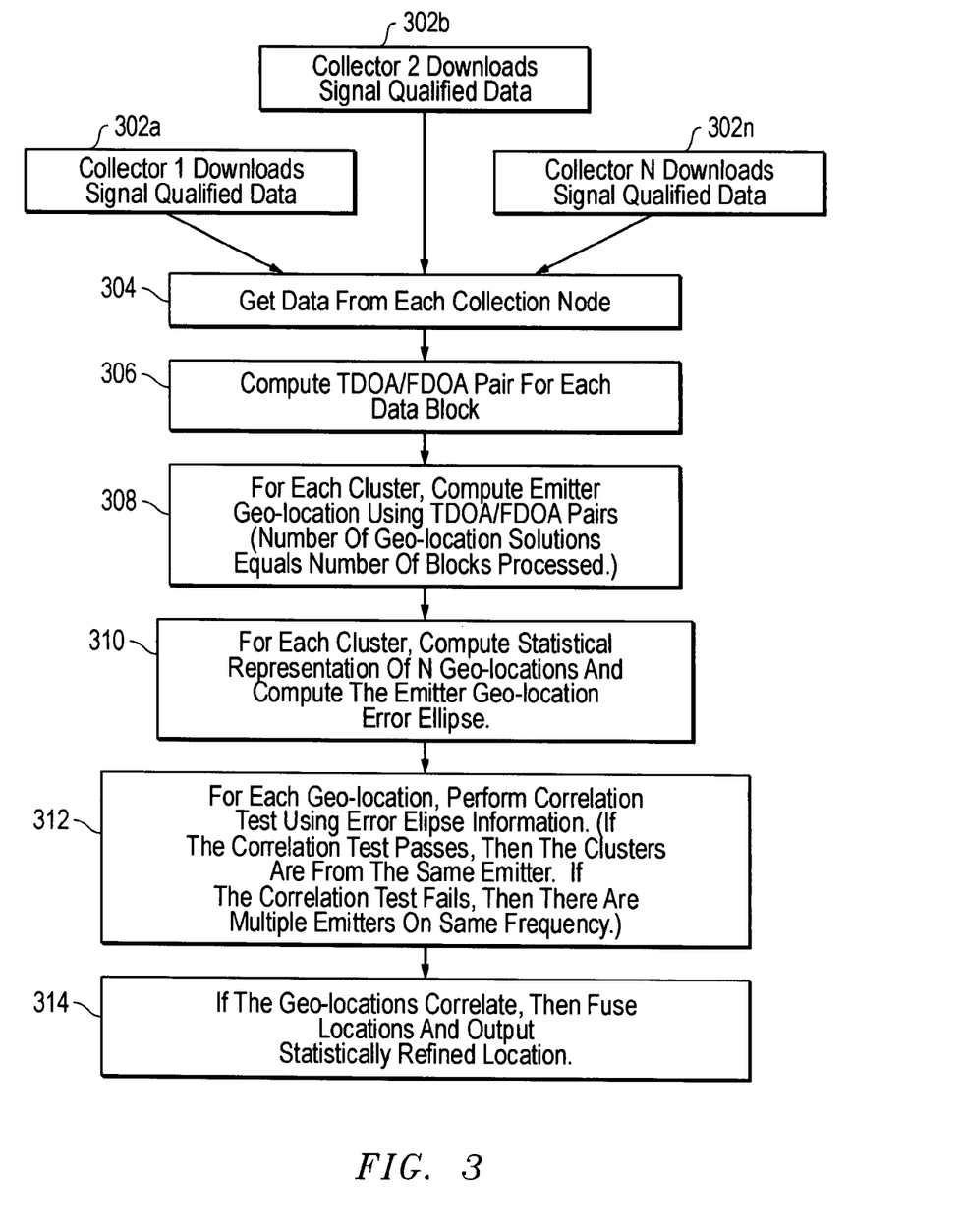
FIG. 3 illustrates functional logic flow according to one exemplary embodiment of the disclosed systems and methods.

FIG. 3 illustrates functional logic flow 300 as it may be practiced for detection and geolocation of multiple emitters on a common frequency according to one exemplary embodiment of the disclosed systems and methods. In describing methodology 200, reference is made to the components of the geolocation system of FIG. 2, however it will be understood that any other system configuration of two or more collection nodes may be utilized that is suitable for separation, geolocation, and/or counting of multiple emitters that are transmitting on a common frequency.

As shown, methodology 300 of FIG. 3 starts with parallel steps 302a and 302b through 302n, where respective multiple collection nodes of sensing platforms 202a, and 202b through 202n of FIG. 2 collect multiple emitter signals (e.g., as emitted by multiple emitters 104 of FIG. 1), and produce and download signal qualified data based on the collected emitter signals to the processing node of sensing platform 202n (i.e., for TDOA/FDOA processing) that includes TDOA/FDOA processing and control circuitry 220. In alternative embodiments, respective multiple collection nodes of sensing platforms 202a, and 202b through 202n of FIG. 2 may additionally or alternatively produce and download signal qualified data to one or more processing node/s that includes TDOA/TDOA and/or FDOA/FDOA processing and control circuitry for TDOA/TDOA and/or FDOA/FDOA processing.

Steps 302 are simultaneously initiated when the collection node processor 204 of each respective sensing platform 202a through 202n receives tasking information from master controller components of sensing platform 202n, and in response thereto initiates collection by scheduling hardware assets in a manner as previously described. In this regard, the receiver 214 of each collection node may be tasked with the frequency, collection bandwidth, collection duration, etc. as previously described.

Still referring to steps 302 of FIG. 3, the collected data from the collection node receiver 214 of each sensing platform 202a, and 202b through 202n may be streamed in one exemplary embodiment to the local memory data buffer 208 of the corresponding sensing platform where real time signal qualification is performed for each block of data prior to downloading to the processing node of sensing platform 202n. Real time signal qualification may be performed in any manner suitable for differentiating between RF signal energy and irrelevant noise, e.g., by employing processing that continuously monitors the incoming data from collection node receiver 214 for signal activity and ignoring irrelevant (e.g., random) noise data until RF signal energy is detected.

Differentiation between irrelevant noise and RF signal energy may be accomplished, for example, by kurtosis or any other suitable methodology. In one exemplary embodiment, signal qualification may be performed by calculating the Signal to Noise Ratio (SNR) and bandwidth of each data block. In this regard, the SNR of each data block may be found by detecting the modulation on the carrier frequency by calculating the kurtosis value of the signal. In such an embodiment, a kurtosis value is a measure of the "peakedness" of the probability distribution of the collected signal data samples. Once the kurtosis value is calculated, the signal information may be translated into an SNR value in decibels (dB). Upon detection of RF signal energy, the data blocks of collected data corresponding to the detected RF signal energy may be saved off until irrelevant noise data is detected once again. Collected data corresponding to the irrelevant noise may again be ignored until RF signal energy is again detected, and data blocks corresponding to the RF signal energy saved again. This process of monitoring and ignoring or saving collected data may continue until the number of saved data blocks reaches a predetermined threshold. Such a pre-determined threshold may correspond, for example, to any number of data blocks that may be suitably retained in the local memory data buffer 208 of a sensing platform for downloading to a processing node, e.g., such as 16 data blocks in one exemplary embodiment or any other suitable number of data blocks selected for a given application.

It will be understood that it is possible that the signal qualification technique performed by the collection node components of each sensing platform 202a, and 202b through 202n may differ from that employed by one or more other collection node components of other sensing platforms 202. However, to preserve the time synchronous nature of the signal qualified information, the data block size used for the energy detection must be pre-defined for all participating collection nodes. The signal qualification data block size for each collection node may be of any suitable size, and in one embodiment may be a size that is a multiple of 1 Kbytes.

Figure 4:
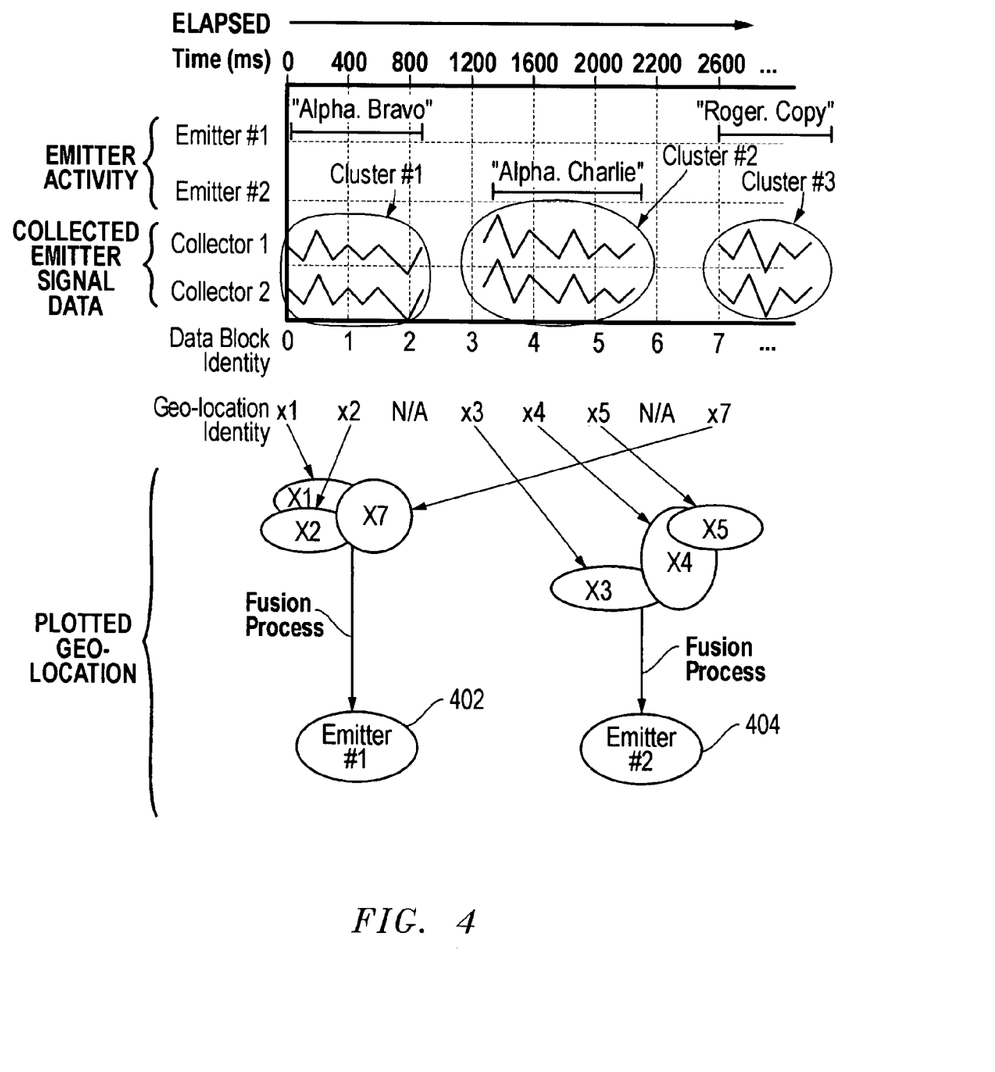
FIG. 4 illustrates a time-line sequence according to one exemplary embodiment of the disclosed systems and methods.

With regard to the methodology 300 of FIG. 3, FIG. 4 illustrates an exemplary time-line sequence for emitter activity, detection and geolocation of multiple emitters #1 and #2 that are sequentially emitting RF signals on a common frequency according to one exemplary embodiment of the disclosed systems and methods. As shown in FIG. 4, a speaker on emitter #1 (e.g., corresponding to emitter 104a of FIG. 1) transmits during a time of from 0 milliseconds to about 800 milliseconds, and this continuous signal transmission is collected by a collector 1 (e.g., collection node of sensing platform 202a) and a collector 2 (e.g., collector node of sensing platform 202b) as a first emission cluster of data blocks 0, 1 and 2. This is followed by a speaker on emitter #2 (e.g., corresponding to emitter 104b of FIG. 1) emitting a continuous signal transmission during a time of from about 1200 milliseconds to about 2200 milliseconds which is collected by collector 1 and collector 2 as a second emission cluster of data blocks 3, 4 and 5, and then followed by the speaker on emitter #1 who again emits a continuous signal transmission starting at a time of about 2600 milliseconds which is collected by collector 1 and collector 2 as a third emission cluster beginning with data block 7. Such an alternating emission pattern of continuous signal transmissions corresponds, for example, to RF communication signals transmitted between two PTT radio signal emitters. Therefore, all data blocks of each continuous signal transmission is treated as a transmission from a single emitter.

It will be understood that this sequence may continue with emitters #1 and #2 alternating emission in the same manner until a total emission cluster N of data blocks is collected. It will also be understood that while FIG. 4 illustrates the case where two emitters are alternately emitting on a common frequency, that a similar data collection process may be followed where three or more emitters are alternately emitting on a common frequency.

Returning to FIG. 3, in step 304 the qualified data with signal modulation activity is obtained from each participating data collection node of each sensing platform 202 by the processing node (i.e., TDOA/FDOA processing and control circuitry 220) of sensing platform 202n. In step 306, TDOA/FDOA processing and control circuitry 220 computes the TDOA and FDOA pair for each data block of the downloaded qualified data, using signal cross-correlation methods such as Cross Ambiguity Function (CAF) or other suitable methodology. In one exemplary embodiment, a CAF plane may be estimated for every block of data in each emission cluster of FIG. 4, and the number of TDOA/FDOA pairs may be equal to the number of blocks in an emission cluster. Where two or more emitters emit overlapping RF signals at the same time (e.g., on top of each other), CAF processing may be employed to distinguish and compute TDOA/FDOA pair data for the RF signal with the highest energy. Where the overlapping RF signals are too close in strength to allow one of the signals to be distinguished, an outlier location will be produced in step 308 and removed in step 310, as described in further detail below.

Next, in step 308, the emitter geo-location is computed using TDOA/FDOA pairs of step 306. In one exemplary embodiment, the total number of geo-location solutions will equal to the total number of blocks in each emission cluster. For example, as shown in FIG. 4, emitter geo-locations x1 and x2 may be computed for respective data blocks 0 and 1 of the first emission cluster, emitter geo-locations x3, x4 and x5 may be computed for respective data blocks 3, 4 and 5 of the second emission cluster, and emitter geo-location x7 may be computed for data block 7 of the third emission cluster. Even when transmitted from a single emitter, multiple emitter geo-location solutions may be computed for the single emitter due to movement of sensing platforms that correspond to the collection nodes, and/or movement of the single emitter relative to the sensing platforms. As described further herein, using the disclosed systems and methods, such multiple geo-location solutions for a single emitter may be distinguished from multiple geo-location solutions that correspond to respective multiple emitters.

As previously mentioned, TDOA/TDOA and/or FDOA/FDOA pairs may be additionally or alternatively employed in the practice of other embodiments of the disclosed systems and methods to compute emitter geolocations, e.g., using appropriate processing circuitry to compute TDOA/TDOA and/or FDOA/FDOA pairs for each data block of the downloaded qualified data in step 306, and the emitter geo-location computed in step 308 using the TDOA/TDOA and/or FDOA/FDOA pairs of step 306.

In step 310 of FIG. 3, a statistical representation of N geo-locations is computed for each emission cluster, e.g., by average of N geo-locations. The emitter geo-location is then further refined in step 310 using statistical information to remove all outliers. For example, every emitter geo-location solution may be evaluated and if the location exceeds a selected standard deviation threshold (e.g., greater than about 2 sigma, greater than about 3 sigma, or greater than any other selected standard deviation value), the emitter location is deemed an outlier and is removed. This process may require several iterations until all such outliers are removed, and so that each emission cluster will include one remaining geo-location solution surrounded by a bounded geographical area of possible geo-location solutions (e.g., in the form of a geolocation error ellipse that includes a circular ellipse having equivalent major and minor axes) which may be referred to as a geolocation error area and that corresponds to a geographical area within which the actual geo-location exists, and so that there are N geo-locations for N emission clusters (i.e., the total number of geo-locations equals the number of emission clusters). In this regard the geographical boundary of each geographical area surrounding a remaining geo-location solution (e.g., the boundary of each error ellipse) may be calculated by statistical variance of remaining geo-locations.

Next, in step 312, a correlation test is performed for each geo-location of step 310. Such a correlation test may be performed using error ellipse information of step 310, and by comparing the geographical areas of the geolocation error ellipses of the N geo-locations of step 310 to each other. If all of the geolocation error ellipses are found to correlate to the same emitter geolocation, then the correlation test passes and there is only one emitter (e.g., speaker). However, if the correlation test results in multiple geo-location solutions, then the correlation test has failed and indicates that there is more than one emitter (e.g., speaker) operating on the same frequency. A correlation test may be performed in step 312 using any methodology suitable for comparing locations of multiple error ellipses relative to each other to determine if they represent a single emitter geolocation or more than one emitter geolocation. The particular correlation test methodology may be determined, for example, based on one or more factors such as statistical representation methodology employed to create the geolocation error ellipses, empirical experience, etc.

For example, multiple error ellipses that lie wholly separate and apart from each other (without overlapping) may be determined not to correlate with each other and therefore to represent multiple separate emitter geolocations. However, where multiple error ellipses overlap with each other, correlation between the geolocation error ellipses may be determined to exist so that they represent one emitter geolocation. Alternatively, the amount of multiple error ellipse overlap may be used to determine whether correlation exists between overlapping error ellipses, e.g., such that two error ellipse are only deemed to correlate if their respective geographic areas overlap by more than a certain percentage. In yet another possible alternative, the amount of separation between non-overlapping multiple error ellipses may be used to determine whether correlation exists between overlapping error ellipses, e.g., such that two error ellipse are deemed to correlate unless they are separated from each other by more than a threshold distance.

FIG. 4 illustrates an example of error ellipses as they may be computed using step 310, and how a correlation test of step 312 may be performed. As shown in FIG. 4, three overlapping error ellipses corresponding to geo-locations x1, x2 and x7 of step 308 have been computed, and three overlapping error ellipses corresponding to geo-locations x3, x4 and x5 of step 308 have been computed. In this exemplary embodiment, no geographical overlap is observed to exist between the overlapping error ellipses X1, X2 and X7 and the overlapping error ellipses X3, X4 and X5, meaning that there is no correlation between the geolocation error ellipses of these two sets and therefore at least two emitter geo-locations exist. However, error ellipses X1, X2 and X7 pass the correlation test with respect to each other because they geographically overlap and therefore represent a single and first emitter geo-location. Similarly, error ellipses X3, X4 and X5 pass the correlation test with respect to each other because they geographically overlap and therefore represent a single and second emitter geo-location.

Returning to methodology 300 of FIG. 3, the geolocation error ellipses for any correlated geo-locations are fused together in step 314, and a statistically refined geo-location for one or more emitters is output, e.g., output as emitter geolocation information 230 from TDOA/FDOA processing and control circuitry 220 of FIG. 2, e.g., via graphical display, numerical coordinates, etc. FIG. 4 illustrates how areas of correlated error ellipses X1, X2 and X7 may be fused together to form a single statistically-refined geolocation area 402 for emitter #1 and how areas of correlated error ellipses X3, X4 and X5 may be fused together to form a single statistically-refined geolocation area 404 for emitter #2. Fusion of multiple error ellipse areas may be performed, for example, by probabilistic joint density function. The combined location is the location that maximizes the probabilistic joint density function.

Figure 5:
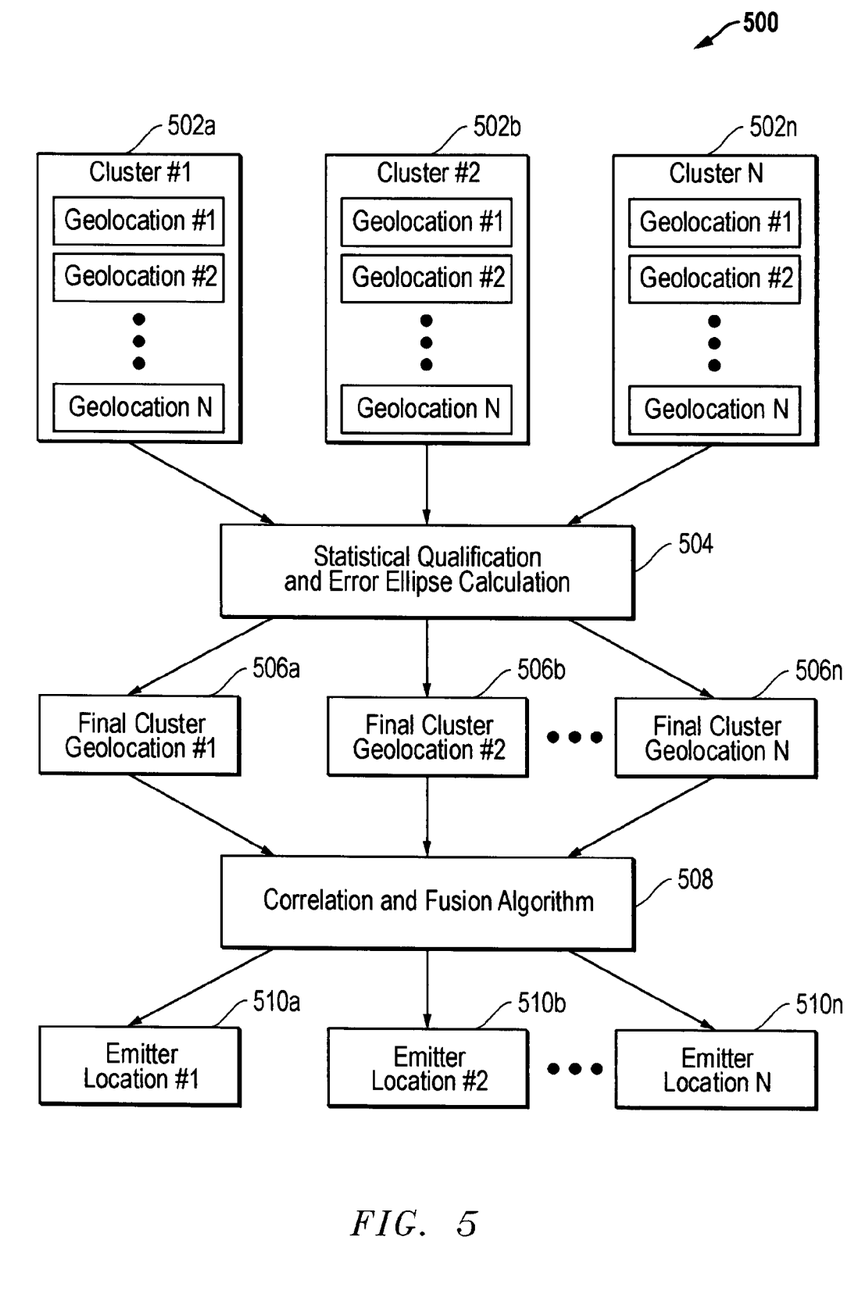
FIG. 5 illustrates data flow according to one exemplary embodiment of the disclosed systems and methods.

FIG. 5 illustrates data flow 500 as it may be practiced according to one exemplary embodiment of the disclosed systems and methods for detection and geolocation of multiple emitters 1 through N (e.g., corresponding to multiple emitters 104a through 104n of FIG. 1) that are emitting on a common frequency. Data flow 500 may be executed, for example, by TDOA/FDOA processing and control circuitry 220 of FIG. 2, or by any other suitable processing node configuration. As shown in FIG. 5, multiple emission clusters 502a, and 502b through 502n may be collected that each include multiple emitter geolocations #1 and #2 through N that are each determined from TDOA/FDOA pairs, e.g., in step 308 of FIG. 3. In such an example, multiple emission clusters 502a, and 502b through 502n represent data collected by local memory data buffers 208 during a common signal collection time of steps 302 of FIG. 3. Data from multiple emission clusters 502a, and 502b through 502n may then be used for statistical qualification and error ellipse calculation 504 (e.g., corresponding to step 310 of FIG. 3), resulting in multiple final cluster geolocations #1 and #2 through N. Correlation and fusing algorithm processing 508 is then performed on multiple emission clusters 502a, and 502b through 502n (e.g., corresponding to steps 312 and 314 of FIG. 3), resulting in statistically refined geolocations #1 and #2 through N for multiple emitters which may be output, for example, as emitter geolocation information 230 from TDOA/FDOA processing and control circuitry 220 of FIG. 2.

It will be understood that the order and methodology of the steps and/or data flow of FIGS. 3 and 5 are exemplary only and that any other combination of additional, fewer and/or alternative steps of data flow may be employed to separate, geolocate, and/or determine the number of emitters that are emitting RF signal data on a common RF frequency by performing TDOA/FDOA processing on emission cluster data produced by the emitters, and statistically qualifying and fusing geolocation data to produce geolocation information.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of locating one or more emitters that are emitting multiple sequential radio frequency (RF) signals on a common frequency, said method comprising:

providing multiple collection nodes, each of said multiple collection nodes being spaced apart from the other of said multiple collection nodes;

collecting said multiple sequential RF signals at each of said multiple collection nodes, each of said sequential emitted RF signals being collected at each of said multiple collection nodes as a cluster of data blocks;

determining a first group of multiple geolocation solutions based on a first one of said multiple clusters of data blocks by measuring at least one of time difference of arrival (TDOA) information or frequency difference of arrival (FDOA) information for said multiple sequential RF signals between at least two of said multiple collection nodes;

determining a second group of multiple geolocation solutions based on a second one of said multiple clusters of data blocks by measuring at least one of TDOA information or FDOA information for said multiple sequential RF signals between at least two of said multiple collection nodes;

determining a first geographic area corresponding to said first one of said multiple cluster of data blocks, said first geographic area including at least a portion of said first group of multiple geolocations, and determining a second geographic area corresponding to said second one of said multiple cluster of data blocks, said second geographic area including at least a portion of said second group of multiple geolocations; and comparing said first determined geographic area with said second determined geographic area to determine whether or not said first determined geographic area correlates to the same emitter geolocation as said second determined geographic area.

2. The method of claim 1, wherein said first geographic area comprises a first error ellipse; wherein said second geographic areas comprises a second error ellipse; and wherein said method further comprises determining said first error ellipse by removing a portion of said group of multiple geolocation solutions using statistical analysis, and determining said second error ellipse by removing a portion of said group of multiple geolocation solutions using statistical analysis.

3. The method of claim 1, further comprising fusing together said first and second determined geographic areas into a single fused geographic area if said first and second determined geographic areas are determined to correlate to the same emitter location, said single fused geographic area including a location of at least one of said emitters.

4. The method of claim 3, further comprising determining if said first determined geographic area correlates to the same emitter geolocation as said second determined geographic area by determining if said first determined geographic area overlaps with said second determined geographic area; and fusing together said first and second determined geographic areas into a single fused geographic area if said first and second determined geographic areas are determined to overlap with each other.

5. The method of claim 3, wherein said one or more emitters comprise at least two emitters, each of which emits at least one of said sequential RF signals on said common frequency; and wherein said method further comprises:
    collecting a first one of said multiple sequential RF signals emitted by a first one of said emitters at each of said multiple collection nodes as said first one of said multiple clusters of data blocks; and
    collecting a second one of said multiple sequential RF signals emitted by a second one of said emitters at each of said multiple collection nodes as said second one of said multiple clusters of data blocks;
    wherein said first geographic area includes the geolocation of said first emitter;
    wherein said second geographic area includes the geolocation of said second emitter; and
    wherein said step of comparing comprises comparing said first determined geographic area with said second determined geographic area to determine that said first determined geographic area does not correlate to the same emitter location as said second determined geographic area.

6. The method of claim 5, further comprising determining that said first determined geographic area does not correlate to the same emitter location as said second determined geographic area by determining that said first determined geographic area does not overlap with said second determined geographic area.

7. The method of claim 3, wherein a first one of said multiple collection nodes comprises a first airborne sensing platform; wherein a second one of said multiple collection nodes comprises a second airborne sensing platform; and wherein said method further comprises:
    providing a processing node in communication with said first and second ones of said multiple collection nodes;
    communicating said multiple clusters of data blocks from each of said first and second collection nodes to said processing node; and
    performing the following steps at said processing node:
        determining said first group of multiple geolocation solutions, determining said second group of multiple geolocation solutions, determining said first geographic area, determining said second geographic area, comparing said first determined geographic area with said second determined geographic area, and fusing together said first and second determined geographic areas into said single fused geographic area if said first and second determined geographic areas are determined to correlate to the same emitter location.

8. The method of claim 7, wherein said processing node is a processing and control node; and wherein said method further comprises communicating control information from said processing and control node to each of said multiple collection nodes to control said step of collecting said multiple sequential RF signals at each of said multiple collection nodes.

9. The method of claim 8, wherein said first airborne sensing platform is a first aircraft; wherein said second airborne sensing platform is a second aircraft; and wherein said first and second aircraft are moving at different velocities and headings relative to said at least one of said emitters.

10. The method of claim 3, further comprising determining said first group of multiple geolocation solutions based on a first one of said multiple clusters of data blocks by measuring time difference of arrival (TDOA) information and measuring frequency difference of arrival (FDOA) information for said multiple sequential RF signals between at least three of said multiple collection nodes, and determining said second group of multiple geolocation solutions based on a second one of said multiple clusters of data blocks by measuring TDOA information and FDOA information for said multiple sequential RF signals between at least three of said multiple collection nodes.

11. The method of claim 3, wherein said one or more emitters comprise at least two emitters, each of which emits at least one of said sequential RF signals at a different location on said common frequency; and wherein said method further comprises:
    determining a third group of multiple geolocation solutions based on a third one of said multiple clusters of data blocks by measuring time difference of arrival (TDOA) information and measuring frequency difference of arrival (FDOA) information for said multiple sequential RF signals between at least two of said multiple collection nodes;
    determining a third geographic area corresponding to said third one of said multiple cluster of data blocks, said third geographic area including at least a portion of said third group of multiple geolocations;
    comparing said third determined geographic area with said first and second determined geographic areas to determine whether or not said third determined geographic area correlates to the same emitter geolocation as said second determined geographic area;
    fusing together said third determined geographic area with said first determined geographic area into a single fused geographic area when said third determined geographic area is determined to correlate to the same emitter location as said first determined geographic area, said single fused geographic area including a location of said first emitter; and
    not fusing said second determined geographic area with said first and second determined geographic areas when said second determined geographic area is determined not to correlate to the same emitter location as said first and second determined geographic areas, said second geographic area including a location of said second emitter.

12. An emitter location system, comprising:
    a first collection node configured to receive radio frequency (RF) signals, said first collection node comprising a first sensing platform and signal processing circuitry configured to process RF signals received at said first sensing platform on a time and frequency basis;

a second collection node configured to receive radio frequency (RF) signals, said second collection node comprising a second sensing platform and signal processing circuitry configured to process RF signals received at said second sensing platform on a time and frequency basis; and a processing node comprising processing circuitry configured to communicate with said signal processing circuitry of said first collection node and said signal processing circuitry of said second collection node;

wherein said processing circuitry of said processing node is configured to:

receive radio frequency (RF) emission cluster data from each of said first and second collection nodes, said RF emission cluster data being produced by one or more RF emitters on a common frequency and comprising at least two different clusters of data blocks, perform at least one of time difference of arrival (TDOA)/frequency difference of arrival (FDOA), TDOA/TDOA, or FDOA/FDOA processing on said RF emission cluster data to produce at least two geolocation areas that each correspond to a respective different one of said clusters of data blocks, and compare a first one of said geographic areas with a second and different one of said geographic areas to determine whether or not said first geographic area correlates to the same emitter geolocation as said second determined geographic area.

13. The system of claim 12, wherein said processing circuitry of said processing node is further configured to fuse together said first and second geographic areas into a single fused geographic area if said first and second geographic areas are determined to correlate to the same emitter location, said single fused geographic area including a location of said emitter.

14. The system of claim 13, wherein said processing circuitry of said processing node is further configured to output said single fused geographic area as emitter geolocation information.

15. The system of claim 12, wherein said processing node further comprises control circuitry configured as a master controller for communicating and controlling operation of said first and second collection nodes.

16. The system of claim 12, wherein said first and second sensing platforms are each aircraft; wherein said first sensing platform comprises a first sensor antenna coupled to said signal processing circuitry of said first sensing platform; wherein said second sensing platform comprises a second sensor antenna coupled to said signal processing circuitry of said second sensing platform.

17. The system of claim 12, further comprising:

a third collection node configured to receive radio frequency (RF) signals, said third collection node comprising a third sensing platform and signal processing circuitry configured to process RF signals received at said third sensing platform on a time and frequency basis;

wherein said processing node is configured to communicate with said signal processing circuitry of said third collection node; and wherein said processing circuitry of said processing node is configured to receive said RF emission cluster data from each of said first, second and third collection nodes.

18. The system of claim 12, wherein said processing circuitry of said processing node is configured to:

receive radio frequency (RF) emission cluster data from each of said first and second collection nodes, said RF emission cluster data being produced by at least two emitters on a common frequency and comprising at least three different clusters of data blocks, each of said at least two emitters being at a different location;

perform at least one of TDOA/FDOA, TDOA/TDOA, or FDOA/FDOA processing on said RF emission cluster data to produce at least three geolocation areas that each correspond to a respective different one of said clusters of data blocks;

compare a first one of said geographic areas with second and third different ones of said geographic areas to determine whether or not said first geographic area correlates to the same emitter geolocation as each of said second and third determined geographic areas;

fuse together said first and third geographic areas into a single fused geographic area when said first and third geographic areas are determined to correlate to the same emitter location, said single fused geographic area including a location of a first one of said emitters; and not fuse together said second geographic area with said first and second geographic areas when said second geographic area is determined not to correlate to the same emitter location as said first and second geographic areas, said second geographic area including a location of said second emitter.

19. A system for processing collected clusters of data blocks to locate one or more emitters that are emitting multiple sequential radio frequency (RF) signals on a common frequency, said system comprising:

one or more processing components configured to receive collected clusters of data blocks from each of multiple collection nodes, each of said collected clusters of datablocks collected from a corresponding sequential emitted RF signal;

wherein said one or more processing components is further configured to:

determine a first group of multiple geolocation solutions based on a first one of said multiple clusters of data blocks by measuring at least one of time difference of arrival (TDOA) information or frequency difference of arrival (FDOA) information for said multiple sequential RF signals between at least two of said multiple collection nodes, determine a second group of multiple geolocation solutions based on a second one of said multiple clusters of data blocks by measuring at least one of TDOA information or FDOA information for said multiple sequential RF signals between at least two of said multiple collection nodes, determine a first geographic area corresponding to said first one of said multiple cluster of data blocks, said first geographic area including at least a portion of said first group of multiple geolocations, determine a second geographic area corresponding to said second one of said multiple cluster of data blocks, said second geographic area including at least a portion of said second group of multiple geolocations, compare said first determined geographic area with said second determined geographic area to determine whether or not said first determined geographic area correlates to the same emitter geolocation as said second determined geographic area, fuse together said first and second determined geographic areas into a single fused geographic area if said first and second determined geographic areas are determined to correlate to the same emitter location, said single fused geographic area including a location of at least one of said emitters, and output emitter geolocation information based on said single fused geographic area.

20. The system of claim 19, wherein said first geographic area comprises a first error ellipse; wherein said second geographic areas comprises a second error ellipse; and wherein said one or more processing components are further configured to:

determine said first error ellipse by removing a portion of said group of multiple geolocation solutions using statistical analysis;

determine said second error ellipse by removing a portion of said group of multiple geolocation solutions using statistical analysis; and fuse together said first and second error ellipses into a single statistically refined fused geographic location if said first and second determined error ellipses are determined to correlate to the same emitter location.

21. The system of claim 19, wherein said one or more emitters comprise at least two emitters, each of which emits at least one of said sequential RF signals on said common frequency; a first one of said multiple sequential RF signals emitted by a first one of said emitters is collected at each of said multiple collection nodes as said first one of said multiple clusters of data blocks; wherein a second one of said multiple sequential RF signals emitted by a second one of said emitters at each of said multiple collection nodes as said second one of said multiple clusters of data blocks; wherein said first geographic area includes the geolocation of said first emitter, and said second geographic area includes the geolocation of said second emitter; and wherein said one or more processing components are further configured to compare said first determined geographic area with said second determined geographic area to determine that said first determined geographic area does not correlate to the same emitter location as said second determined geographic area.

22. The system of claim 19, further comprising multiple collection nodes, each of said multiple collection nodes being configured to collect said multiple sequential RF signals as a cluster of data blocks; wherein a first one of said multiple collection nodes comprises a first aircraft configured as a sensing platform; wherein a second one of said multiple collection nodes comprises a second aircraft configured as a sensing platform; wherein said one or more processing components comprises a processing node configured to communicate with said first and second ones of said multiple collection nodes; wherein each of said first and second ones of said multiple collection nodes are configured to communicate said multiple clusters of data blocks to said processing node; and wherein said processing node is configured to perform the following steps: determining said first group of multiple geolocation solutions, determining said second group of multiple geolocation solutions, determining said first geographic area, determining said second geographic area, comparing said first determined geographic area with said second determined geographic area, and fusing together said first and second determined geographic areas into said single fused geographic area if said first and second determined geographic areas are determined to correlate to the same emitter location.

23. The system of claim 19, wherein said one or more processing components comprises a processing and control node configured to communicate control information to each of said multiple collection nodes to control collection of said multiple sequential RF signals at each of said multiple collection nodes.

24. The system of claim 19, wherein said one or more processing components if further configured to determine said first group of multiple geolocation solutions based on a first one of said multiple clusters of data blocks by measuring time difference of arrival (TDOA) information and measuring frequency difference of arrival (FDOA) information for said multiple sequential RF signals between at least three of said multiple collection nodes, and determining said second group of multiple geolocation solutions based on a second one of said multiple clusters of data blocks by measuring TDOA information and FDOA information for said multiple sequential RF signals between at least three of said multiple collection nodes.

25. The system of claim 19, wherein said one or more emitters comprise at least two emitters, each of which emits at least one of said sequential RF signals at a different location on said common frequency; and wherein said one or more processing components is further configured to:

determine a third group of multiple geolocation solutions based on a third one of said multiple clusters of data blocks by measuring time difference of arrival (TDOA) information and measuring frequency difference of arrival (FDOA) information for said multiple sequential RF signals between at least two of said multiple collection nodes;

determine a third geographic area corresponding to said third one of said multiple cluster of data blocks, said third geographic area including at least a portion of said third group of multiple geolocations;

compare said third determined geographic area with said first and second determined geographic areas to determine whether or not said third determined geographic area correlates to the same emitter geolocation as said second determined geographic area;

fuse together said third determined geographic area with said first determined geographic area into a single fused geographic area when said third determined geographic area is determined to correlate to the same emitter location as said first determined geographic area, said single fused geographic area including a location of said first emitter; and not fuse said second determined geographic area with said first and second determined geographic areas when said second determined geographic area is determined not to correlate to the same emitter location as said first and second determined geographic areas, said second geographic area including a location of said second emitter.

* * * * *